Patented May 1, 1928.

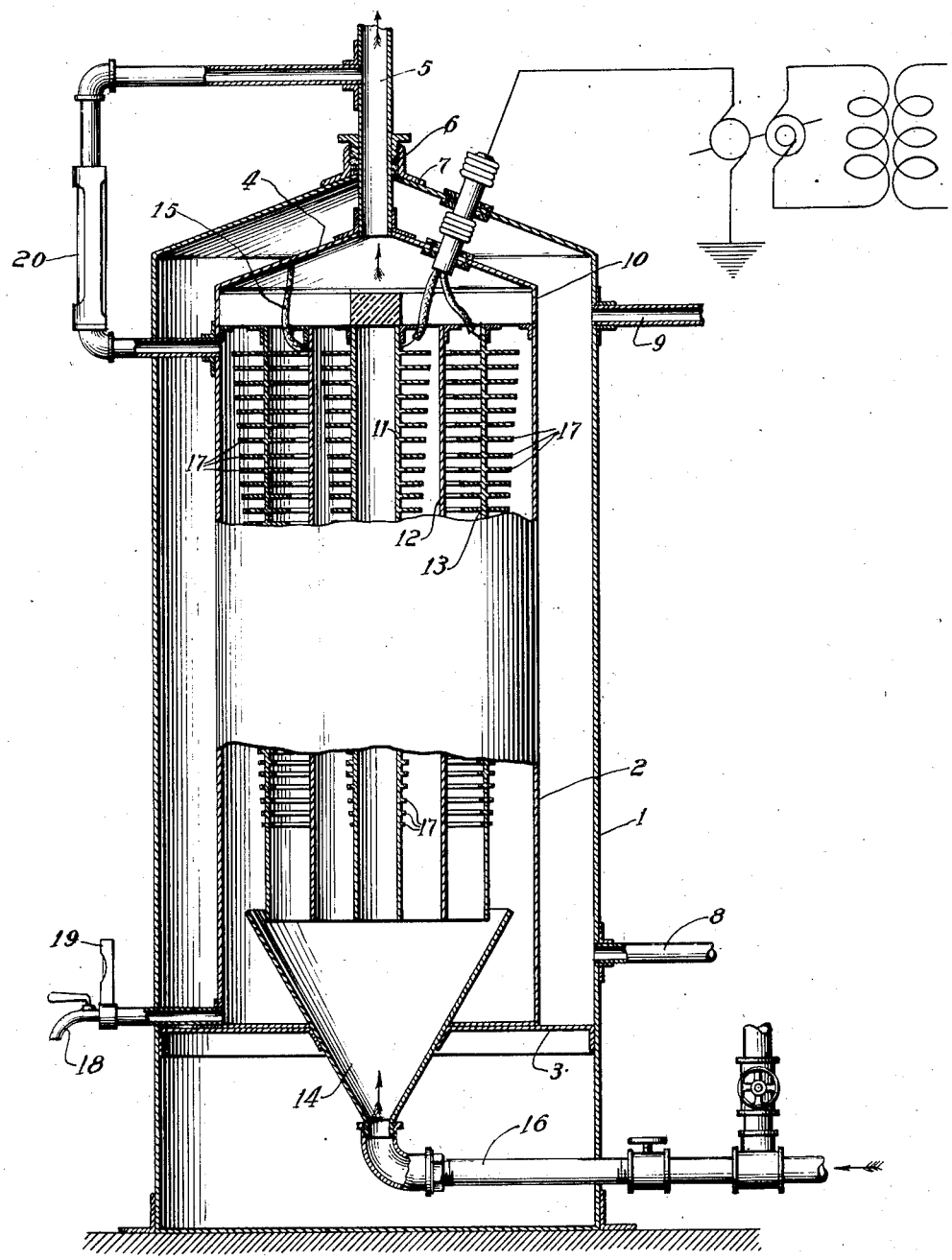

1,667,954

UNITED STATES PATENT OFFICE.

FRANCIS J. SIMINGTON, OF CHICAGO, ILLINOIS.

FLUID PURIFIER.

Application filed July 12, 1926. Serial No. 121,926.

This invention relates to improvements in fluid purifiers or separators, more particularly of the type in which fluid substances are electrically treated.

This invention is described and illustrated as an apparatus for dehydrating and separating liquid and solid impurities from hydrocarbon oil and the like. The apparatus described is more particularly intended for purifying oil from turbine and engine lubricating systems, electrical transformers, switches, etc.; and may be adapted for use in purifying the lubricating oils from internal combustion engines; or for separating solids from gases as in the precipitation of smoke and dust from blast furnaces, cement mills, and similar uses.

The efficacy of continuous low tension electrical flow with respect to the phenomenon of cataspsphoresis, as well as the agglomerating effect of higher tensions, either direct or alternating, have been well known for many years by physicists and also by petroleum engineers. Many such devices have been invented for using low tension or high tension currents, but no device has heretofore been provided in which the effects of both low and high tension are obtained. Apparently low tension dielectric stresses across the fluids are effective in separating the more loosely held particles of water, that is, the particles of water are caused to unite or coalesce to form globules which are sufficiently large to break through the supporting film tension of the oil. Higher tensions cannot be used with a relatively large water content, apparently on account of the water forming short circuiting paths between the electrodes and setting up disruptive discharges. But, in order to separate the very minute particles of water, higher stresses are required to force the minute particles through the oil film, and to cause the particles to pierce the film so that the particles may unite or coalesce into larger globules.

Accordingly, in this invention the oil is passed through a series of decreasing gaps, as the dielectric strength of the oil increases by the separation of the water. This is substantially the equivalent of increasing the tension, since at the narrower gaps higher unit dielectric stresses are produced on the substance by the same difference in voltage. Further objects of the invention are to provide means for collecting and drawing off the impurities so that the device may be continuously operated; to provide a device in which the oil is first passed through a body of sediment so that some of the impurities are separated by contact or attraction therein before the electric treatment takes place; and to provide a simple device which may be safely and efficiently operated.

An illustrative embodiment of the invention is shown in the accompanying drawing, which shows a cross section of an oil purifier.

The vertical, closed, cylindrical shell 1 forms a steam jacket around the inner shell or tank 2, which is supported on the bottom 3 of the shell 1. The upper end 4 of the cylinder or tank 2 is a pyramid, and the oil outlet pipe 5 is mounted in the apex of the top 4 and passes through a packing gland 6 in the upper end 7 of the shell 1. Steam is circulated through the shell 1 and around the tank 2 through the steam pipes 8 and 9, for heating the oil to reduce viscosity.

In the upper end of the tank 2 is mounted a cross-shaped insulating support 10, from which are suspended the inner rod electrode 11, the cylindrical electrode 12 concentric with and surrounding the electrode 11, and the cylindrical electrode 13 around the electrode 12. The electrodes extend nearly to the bottom of the tank 2, and are positioned over the upper end of the hopper 14 which is mounted in the bottom of the tank 2, and projects a short distance into the tank. The walls of the tank 2 are of course grounded, and the middle plain cylindrical electrode 12 is electrically connected by means of the bond 15 to the tank. The flanged electrodes 11 and 13 are connected to a grounded source of high voltage direct current, preferably four hundred or five hundred volts.

The oil is admitted through the inlet pipe 16 into the lower end of the hopper 14, and passes upwardly through the tank and out through the pipe 5 at a slow rate of flow, of about four or five feet per minute.

As the oil passes upwardly under the dielectric strain between the electrodes, the dielectric strength or resistance gradually increases as the water separates from the oil and flows downwardly into the hopper and the bottom of the tank 2. Therefore, in order to proportion the tension in relation to the dielectric strength, so that the charge is distributed throughout the length of the electrodes, and to subject the oil at all stages to as great a tension as the oil can withstand, the gap between the electrodes is gradually decreased. This is accomplished by providing the annular rings or fins 17 on the electrodes 11 and 13, and gradually increasing the width of the fins toward the upper end of the electrodes. The electrode 11 is provided with fins only on the outer surface, while the larger electrode 13 is provided with fins both on the inside and outside so as to be in converging electrical relation with both the plain cylinder 12 and also the shell of the tank 2.

A draw-off valve 18, having a sight gage 19, is tapped into the bottom of the tank, and a sight gage 20 is connected to the upper end of the tank 2 and to the pipe 5.

In operation, the emulsion or impure oil is admitted through the pipe 16 into the bottom of the hopper 14, and flows upwardly through the hopper and the tank, and out through the pipe 5. The velocity of the fluid is reduced in the hopper and a certain amount of impurities will be therein separated, since the oil is caused to flow through the water, sludge, and sediment which is collected in the hopper. As the hopper fills the water, the water overflows into the bottom of the tank, where the depth or amount of water may be determined in the sight gage 19, so that the water may be drawn out through the valve 18 as it collects. It will be understood that freer particles of water become separated and collect at one pole at the lower end of the electrodes. Then as the fluid rises, increasing dielectric stresses are applied which separate out the more firmly entrapped particles, which then flow downward through the increasing gaps into the hopper or the bottom of the tank.

The tank is entirely filled, as may be determined in the sight gage 20, before the current is turned on to the electrodes 11 and 13, so that all the air is removed and the danger of explosion is avoided.

In the treater shown, the edges of the fins or vanes 17, of the positive electrodes 11 and 13, increase in a straight line; this closely approximates the actual increase in dielectric strength, as shown in laboratory tests. It is manifest that this treater is adapted to uniformly increase the unit dielectric stress across the emulsion, substantially proportionately as the dielectric strength of the emulsion increases; this provides a maximum effective charge across the emulsion in all the different zones, and distributes the electrical charge so that the heavy short circuits in the old forms of treaters may be avoided at all points by adjusting the voltage of the charged electrodes. Also, in this form of treater, the agglomerated water drops through between the ever increasing gaps and also tends to decrease the possibility of water formations bridging across between the adjacent oppositely charged electrodes.

Although but one specific embodiment of this invention has been herein shown and described, it will be understood that numerous details of the construction shown may be altered or omitted without departing from the spirit of this invention.

I claim:

1. In an apparatus for separating substances from fluids, a tank, a hopper in the bottom of the tank, means for admitting the fluids into the bottom of the hopper, means for subjecting the fluids to electrical stresses, said means being located above the hopper, and means for drawing off the separated substances from the bottom of the tank to provide a continuously operating device and to retain a certain amount of separated substances in the hopper for collecting affinitive substances from the incoming fluids.

2. In an oil purifier, a vertical cylindrical tank closed at each end, a hopper projecting into the central portion of the bottom of the tank, means for circulating oil upwardly through the hopper and the tank, means for subjecting the oil in passing through the tank to a gradually increasing electrical tension, and means for drawing off the sediment from the bottom of the tank, without disturbing the contents of the hopper.

3. In an oil purifier, a plurality of vertical concentric cylindrical electrodes adjacently alternating in polarity, the electrodes of one polarity having laterally projecting fins on both sides increasing in height from the lower end upwardly, and means for passing oil upwardly between the electrodes.

Signed at Detroit this 20th day of May 1926.

FRANCIS J. SIMINGTON.